(12) United States Patent
Yoshimoto et al.

(10) Patent No.: US 9,063,679 B2
(45) Date of Patent: *Jun. 23, 2015

(54) PRINT CONTROLLER, PRINT CONTROL METHOD, PRINTER, AND PRINTING SYSTEM HAVING A PLURALITY OF RESOURCE SAVING FUNCTIONS FOR A PRINT

(71) Applicant: Sharp Kabushiki Kaisha, Osaka (JP)

(72) Inventors: Tsutomu Yoshimoto, Osaka (JP); Masanori Matsumoto, Osaka (JP); Tomoko Toizumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,450

(22) Filed: Jul. 21, 2014

(65) Prior Publication Data

US 2014/0320882 A1 Oct. 30, 2014

Related U.S. Application Data

(63) Continuation of application No. 12/807,357, filed on Sep. 2, 2010, now Pat. No. 8,823,956.

(30) Foreign Application Priority Data

Sep. 30, 2009 (JP) .................. 2009-228622

(51) Int. Cl.
*G06F 3/12* (2006.01)
*G03G 15/00* (2006.01)

(52) U.S. Cl.
CPC .... *G06F 3/1218* (2013.01); *G03G 2215/00426* (2013.01); *G06F 3/1205* (2013.01); *G06F 3/1219* (2013.01); *G06F 3/1264* (2013.01); *G06F 3/1285* (2013.01); *G03G 15/5083* (2013.01); *G03G 15/502* (2013.01); 
(Continued)

(58) Field of Classification Search
CPC ............ G03G 15/502; G03G 15/5083; G03G 2215/00109; G03G 2215/00426; G06F 3/1205; G06F 3/1219; G06F 3/1264; G06F 3/1285
USPC ............. 358/1.13, 1.15; 399/183, 407, 81, 87
See application file for complete search history.

(56) References Cited

U.S. PATENT DOCUMENTS 5,847,857 A * 12/1998 Yajima et al. ................. 358/468
6,134,019 A 10/2000 Wantuck, Jr. et al.
6,215,977 B1 4/2001 Otani
(Continued)

FOREIGN PATENT DOCUMENTS

JP 2003-248576 9/2003
JP 2006-231828 9/2006
(Continued)

*Primary Examiner* — Benny Q Tieu
*Assistant Examiner* — Quyen V Ngo
(74) *Attorney, Agent, or Firm* — Keating & Bennett, LLP

(57) ABSTRACT

A print controller and method which include: a first step of waiting until one or more post-treatment functions is selected, or until a start instruction is entered; a second step of determining whether a specified post-treatment function of the post-treatment functions is selected, when the start instruction is detected; and a third step of enabling one or more of resource saving functions to be selected only if the specified post-treatment function is not selected, and of starting printing if another start instruction is detected after enabling the resource saving functions to be selected.

8 Claims, 15 Drawing Sheets

(52) U.S. Cl.
CPC .... *G03G2215/00109* (2013.01); *G06F 3/1204* (2013.01); *G03G 15/5087* (2013.01)

(56) References Cited

U.S. PATENT DOCUMENTS

| | | | |
|---|---|---|---|
| 6,724,492 | B1 | 4/2004 | Iwase et al. |
| 2002/0036665 | A1 | 3/2002 | Shima |
| 2002/0060806 | A1 | 5/2002 | Gassho et al. |
| 2002/0097432 | A1* | 7/2002 | Kumashio .................... 358/1.15 |
| 2005/0047813 | A1 | 3/2005 | Hosoi et al. |
| 2005/0200881 | A1* | 9/2005 | Yamade ....................... 358/1.14 |
| 2007/0291286 | A1* | 12/2007 | Utsunomiya et al. .......... 358/1.8 |
| 2008/0049247 | A1* | 2/2008 | Asai et al. .................... 358/1.15 |
| 2008/0170262 | A1 | 7/2008 | Takahashi |
| 2008/0180743 | A1 | 7/2008 | Uruta et al. |
| 2009/0296126 | A1 | 12/2009 | Jang |

FOREIGN PATENT DOCUMENTS

| | | |
|---|---|---|
| JP | 2007-241369 | 9/2007 |
| JP | 2008/134527 | 6/2008 |
| JP | 2008-168599 | 7/2008 |

\* cited by examiner

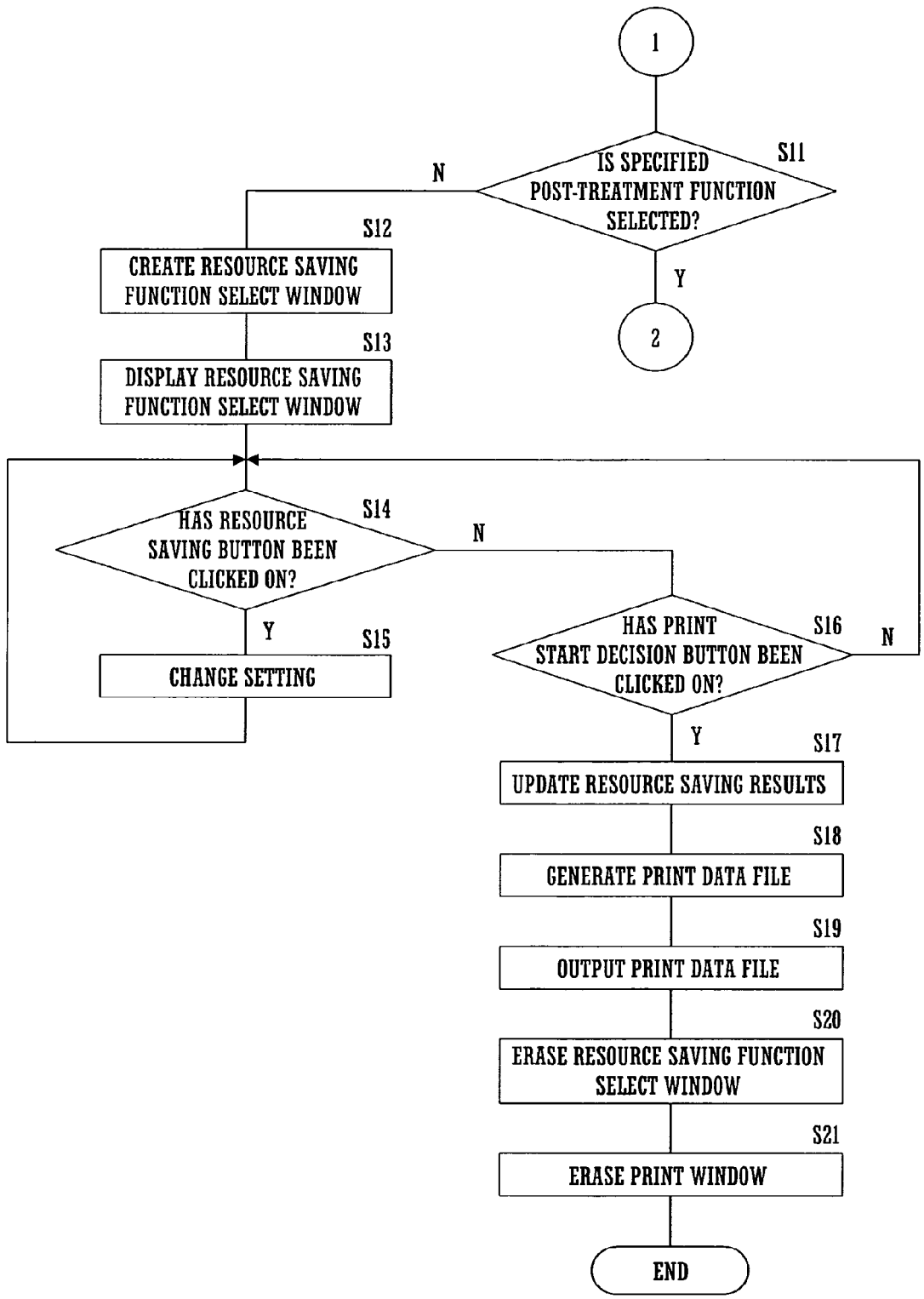

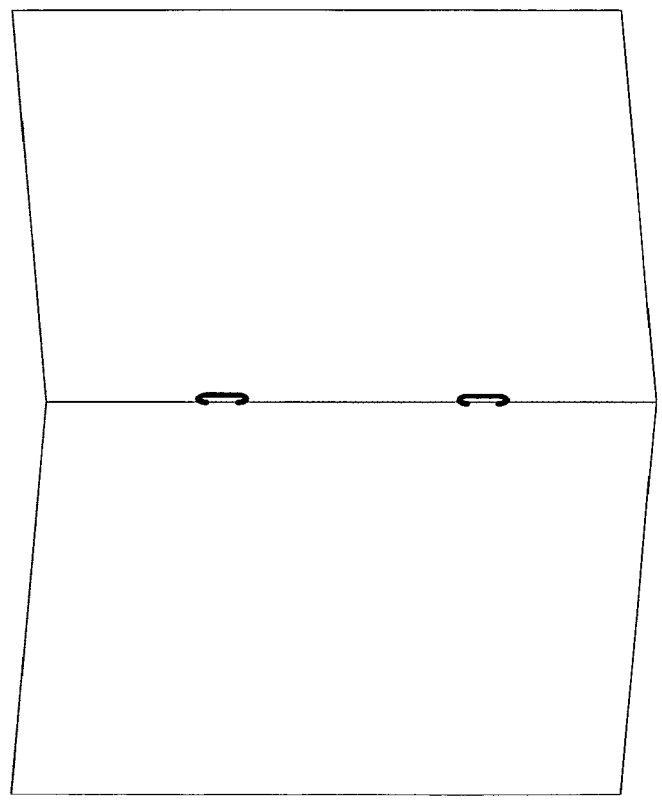

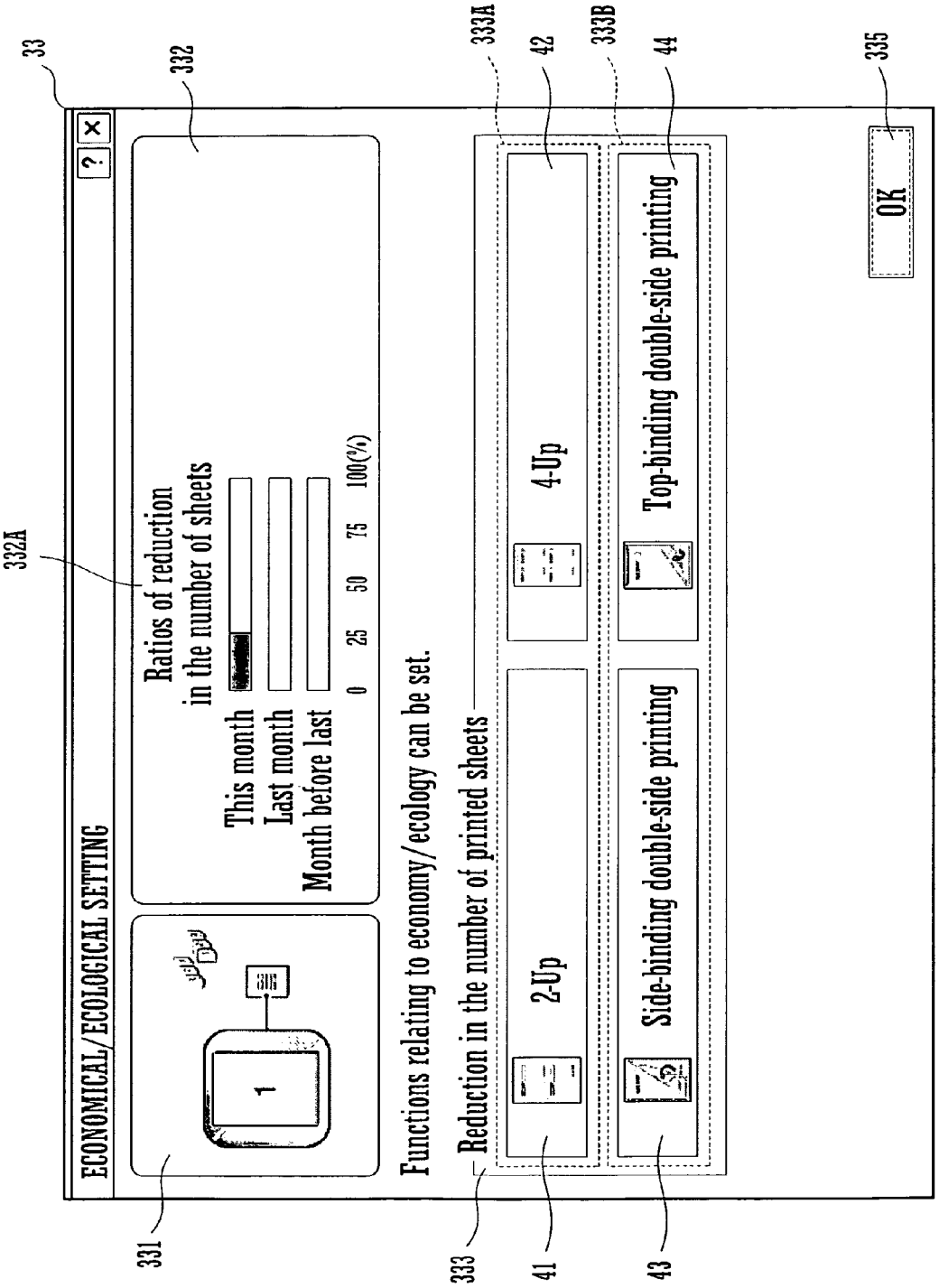

PRINT CONTROLLER, PRINT CONTROL METHOD, PRINTER, AND PRINTING SYSTEM HAVING A PLURALITY OF RESOURCE SAVING FUNCTIONS FOR A PRINT

CROSS REFERENCE

This application is a continuation of copending application U.S. Ser. No. 12/807,357, filed on Sep. 2, 2010, which claims under 35 U.S.C. §119(a) the benefit of Japanese Patent Application No. 2009-228622, filed on Sep. 30, 2009, the entire contents of which are incorporated herein by reference.

BACKGROUND OF THE INVENTION

The present invention relates to a print control program and a print control method for controlling the operation of a printer. The invention also relates to a printer and a printing system in each of which a print control program is installed.

In recent years, from the perspective of terrestrial environment protection, it has been requested strongly to save printing paper and other printing materials in the field of office work including the operation of printers. Printers have resource saving functions that can promote resource savings by reducing the number of print sheets that the printers use. One of the resource saving functions is a double-side printing function, which is to print images on both sides of a sheet. Another of these functions is an aggregate printing function, which is to print two or more reduced images on one side of a sheet.

As an example, JP-2003-248576-A discloses a system that tabulates the reduction in the number of print sheets per user and ratios of reduction in the number of print sheets. The tabulation makes it possible to promote the use of functions capable of contributing to resource savings by users.

Some printers have post-treatment functions for prints in addition to resource saving functions. The post-treatment functions may be a stapling function, a punching function and a Z-folding function.

In many cases, conference materials and reports are sorted by contents and stapled or bound with string. Documents may be stapled and punched for binding with string by post-treatment functions of printers. Printing post-treatment functions may be set for the sizes and directions of images, the binding directions of print sheets, etc. so that the contents of prints can be appealing.

One of the stapling, punching and Z-folding functions may be selected for the printing of a conference material or a report. In this case, if one or more of the resource saving functions is selected, it/they may be set erroneously. The erroneous setting may change the sizes and directions of the images on the document, the binding direction of the print sheets, etc. from those intended by a user. This may make the contents of the prints less appealing, or make the prints hard to see depending on the relationship between the image direction and binding direction. As a result, the document may have to be printed again, with print sheets wasted.

If one or more of the resource saving functions are selected after one of the stapling, punching and Z-folding functions is selected, the resource saving function/s may be set correctly. Even in this case, it may be necessary to cancel the selection of the resource saving function/s, so that the operability may lower.

SUMMARY OF THE INVENTION

An object of the present invention is to provide a print control program and a print control method that can effect resource savings while restraining the operability from decreasing in printing with a specified post-treatment function selected. Another object is to provide a printer and a printing system in each of which such a print control program is installed.

According to the present invention, a print control program is provided for use with a printing system including a printer and a print data file generator. The printer has resource saving functions, which can contribute to resource savings, and post-treatment functions for a print. One or more of the functions can be selected. The printer starts to perform printing in accordance with a print start instruction, with the selected function/s activated. The print data file generator generates a print data file for the printing. The printer or the print control generator controls the printing according to the print control program. The print control program comprises:

a first step of waiting until one or more of the post-treatment functions are selected, or until a print start instruction is entered;

a second step of determining whether a specified post-treatment function of the post-treatment functions is selected, when the print start instruction is detected; and a third step of enabling one or more of the resource saving functions to be selected only if the specified post-treatment function is not selected, and of starting the printing if another print start instruction is detected after enabling the resource saving function/s to be selected.

BRIEF DESCRIPTION OF THE DRAWINGS

FIG. 5 is a flowchart of a part of the procedure that the control unit executes according to the print control program installed in the information processor and embodying part of the present invention.

FIG. 9 is an illustration of prints stapled for saddle stitch binding by the printer.

FIG. 11 is an illustration of the resource saving function select window displayed according to the print control program.

DETAILED DESCRIPTION OF THE INVENTION

Figure 1:
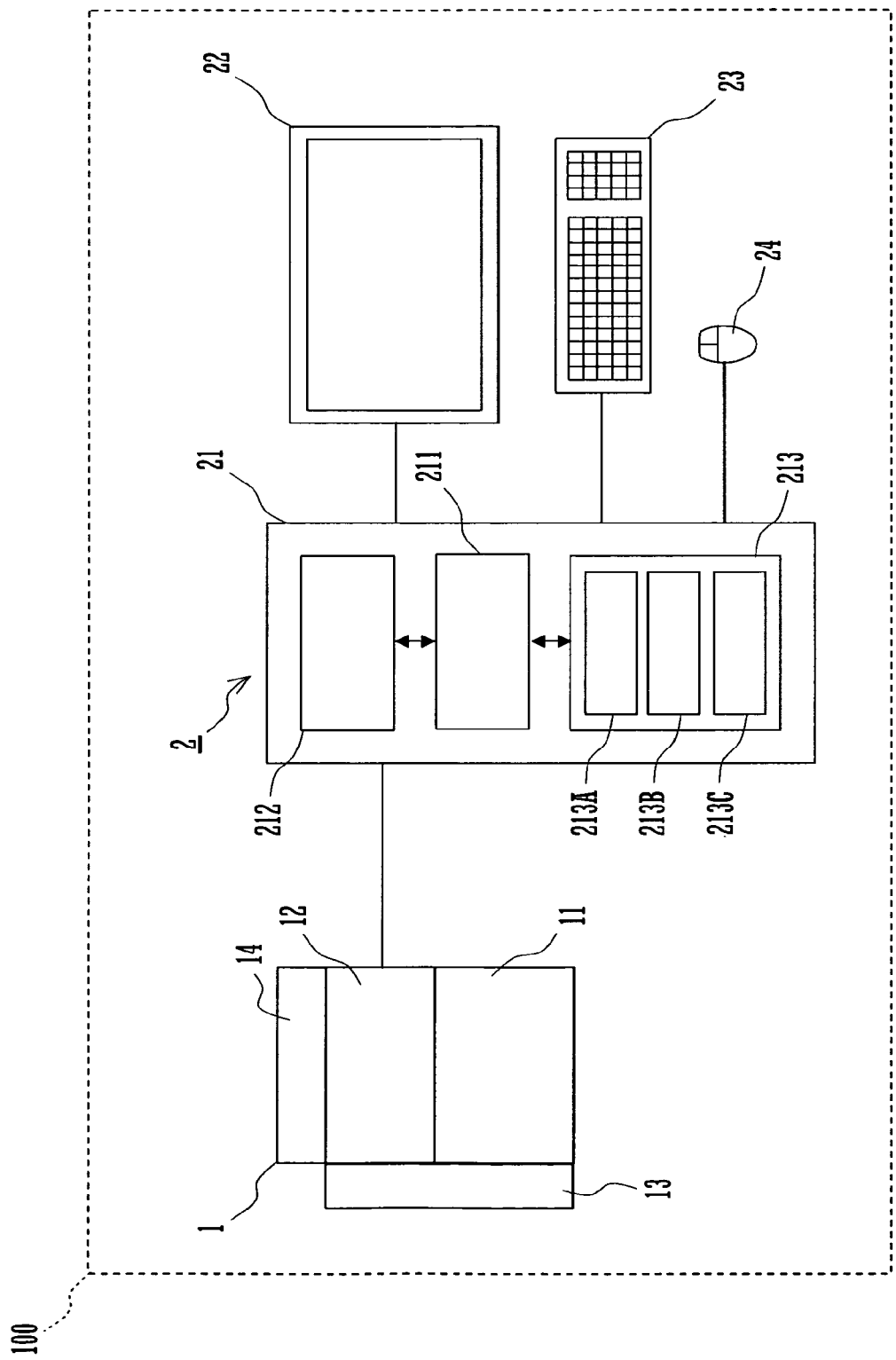
FIG. 1 is a block diagram of a printing system embodying the present invention.

With reference to FIG. 1, a printing system 100 embodying the present invention consists of a printer 1 and an information processor 2, which are connected together.

The printer 1 includes a paper feeding unit 11, an image forming unit 12, a post-treatment unit 13, and an image reading unit 14. The paper feeding unit 11 feeds the image forming unit 12 with a sheet of common paper, a sheet of photographic paper, a sheet of OHP film or another print sheet. The image forming unit 12 makes a print by forming a color or monochromatic image on the print sheet based on print data. The post-treatment unit 13 provides post-treatment for the print.

The printer 1 has stapling functions, punching functions and a Z-folding function as post-treatment functions that involve treating prints mechanically. The printer 1 also has a face-up delivery function, a face-down delivery function and a sorting function as post-treatment functions that do not involve treating prints mechanically. It is essential that the printer 1 should have at least one of the stapling, punching and Z-folding functions as a post-treatment function.

The printer 1 further has double-side printing functions, aggregate printing functions and a monochromatic printing function. The double-side and aggregate printing functions are resource saving functions capable of contributing to resource savings by reducing the number of print sheets that the printer 1 uses.

The printer 1 may be a multi-function printer for electrophotographic printing. The information processor 2 might be connected to an electrophotographic printer, an ink jet printer and other printers.

The information processor 2 may be a personal computer and includes a main body 21, a display 22, a keyboard 23, and a mouse 24. The main body 21 includes a control unit 211, a memory unit 212 and a program storage unit 213.

The control unit 211 is connected to the display 22, keyboard 23, and mouse 24, and also connected to the printer 1 directly or via a network.

An operating system (not shown), an application program 213A for data file generation, a printer driver 213B and a print control program 213C are installed in the program storage unit 213. The control unit 211 controls the operation of the printer 1 according to the driver 213B during printing. The control program 213C embodies part of the present invention. The control unit 211 operates according to the programs in the program storage unit 213.

While the application program 213A is active, the control unit 211 generates an image data file based on data entered by means of the keyboard 23 and mouse 24. The image data file may include document data. The control unit 211 converts the generated image data file into a display data file, displays the display data file on the display 22, and stores the image data file in the memory unit 212.

While the printer driver 213B is active, the control unit 211 generates a print data file from the image data file in the memory unit 212 based on data entered by means of the keyboard 23 and mouse 24. The control unit 211 outputs the generated print data file to the printer 1 via an interface (not shown). The information processor 2 functions as a print data file generator, which generates a print data file for printing by the printer 1.

Figure 2:
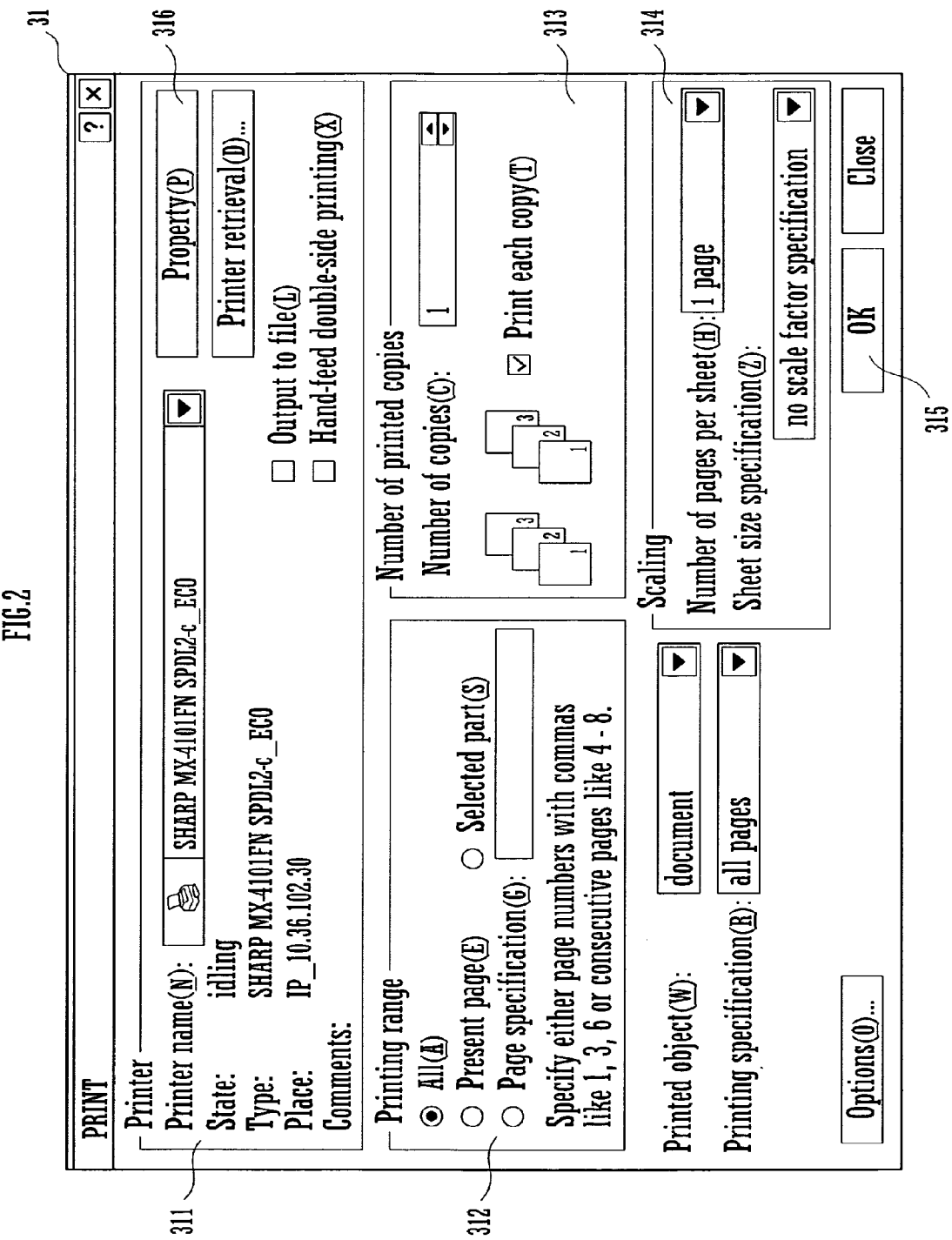
FIG. 2 is an illustration of the print window displayed according to the printer driver installed in the information processor of the printing system.

If a user makes a print request for the image data file in the memory unit 212 by means of the keyboard 23 or mouse 24 while the application program 213A is active, the printer driver 213B gets active, so that a print window 31 as shown by FIG. 2 appears on the display 22.

With reference to FIG. 2, a printer setting area 311, a print range area 312, an area 313 for the number of copies, a scaling area 314 and a print start button 315 are laid out in the print window 31.

In the print range area 312, the user can specify pages of the image data file generated with the application program 213A.

In the area 313 for the number of copies, the user can set the number of copies of the specified pages of the image data file.

The scaling area 314 shows the set or computed number of pages per sheet and the specified sheet size as information necessary for the decision of the scale factor at which an image or images are to be formed on print sheets.

The user can click on the print start button 315 to instruct the control unit 211 to start to control the operation of the printer 1.

Figure 3:
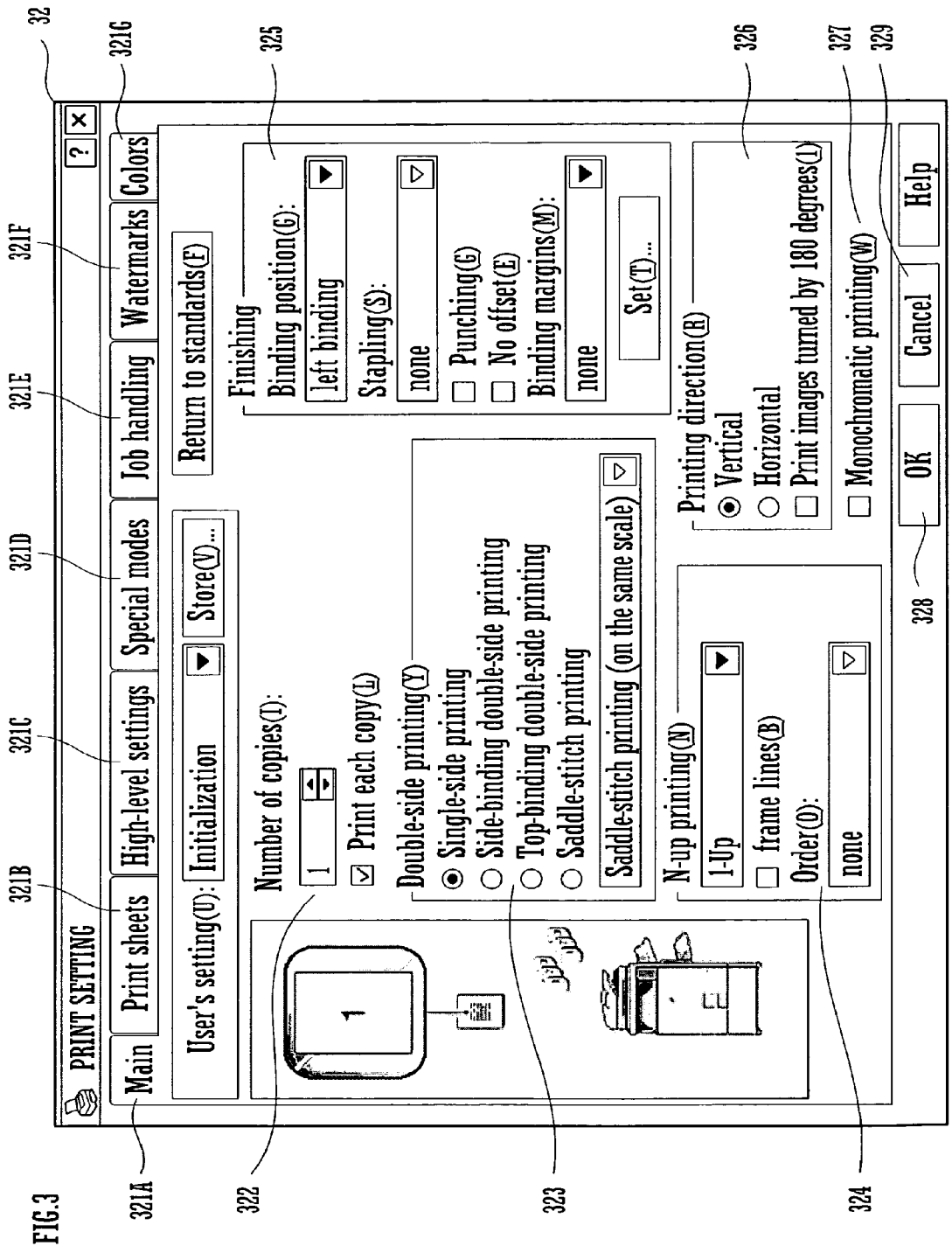
FIG. 3 is an illustration of the main setting window displayed according to the printer driver.

The name of the printer 1 is shown in the printer setting area 311. If the information processor 2 were connected to two or more printers, one of them could be selected in the printer setting area 311. The printer setting area 311 has a property button 316 for the confirmation of selections and settings. If the property button 316 is clicked on, a main setting window 32 as shown by FIG. 3 appears on the display 22. In the main setting window 32, one or more of the post-treatment functions and one or more of the resource saving functions can be selected.

If the property button 316 in the print window 31 is clicked on, specific selection items for the post-treatment functions are displayed in the main setting window 32. Accordingly, the display of the print window 31 enables post-treatment function selection including clicking on the property button 316.

With reference to FIG. 3, the main setting window 32 has pages 321A-321G. Each of the pages 321A-321G shows what functions of the printer 1 are selected and what settings are made for the functions of the printer. On the pages 321A-321G, selections and settings can be changed.

For example, the main page 321A has areas 322-327, where the user can change the selections and settings for the number of copies, the double-side printing functions, the aggregate printing functions, finishing, the printing direction and the monochromatic printing function respectively.

The main setting window 32 also has a decision button 328 and a cancel button 329 as selection/setting completion buttons, on which the user clicks when he/she has confirmed the selections and settings in this window or changed one or more of them. The user can click on the decision button 328 to decide the changed selection/s or setting/s. The user can click on the cancel button 329 to cancel the changed selection/s or setting/s.

Figure 4:
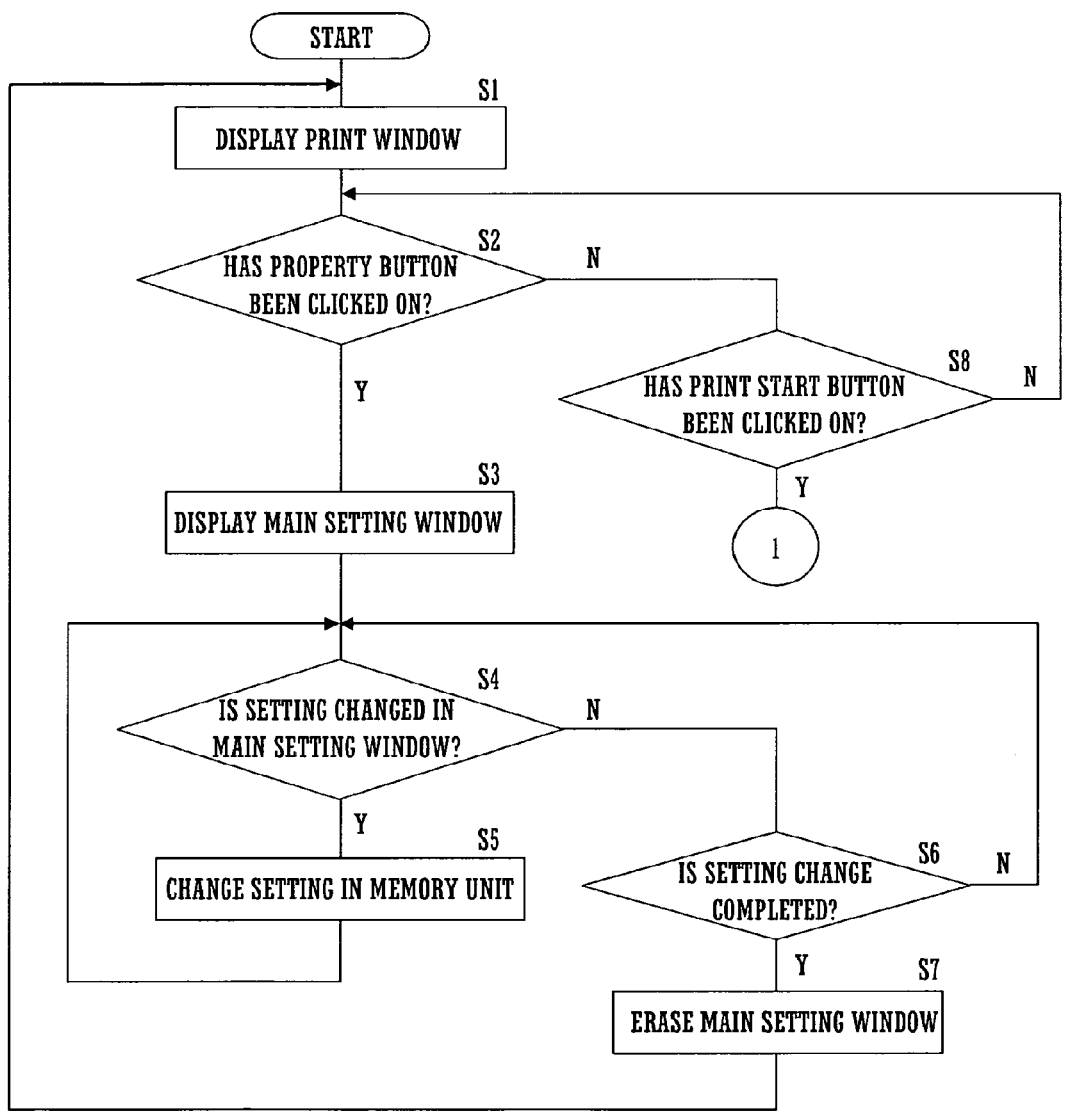
FIG. 4 is a flowchart of the procedure that the control unit of the information processor executes according to the printer driver.

With reference to FIG. 4, if the user makes a print request to the information processor 2 for the image data file in the memory unit 212 while the application program 213A is active, the control unit 211 displays the print window 31 (FIG. 2) at the front of the display 22 at S1. Then, the control unit 211 waits for the user to click on the property button 316 or the print start button 315.

As stated already, if the property button 316 is clicked on, specific selection items for the post-treatment functions are displayed. Therefore, the steps of displaying the print window 31 at the front of the display 22 and waiting for the user to click on the property button 316 or the print start button 315 correspond to the step of waiting for a user to either select a post-treatment function or enter a start instruction.

If the user makes a selection/setting confirmation request at S2 by clicking on the property button 316 in the print window 31, the control unit 211 displays the main setting window 32 (FIG. 3) at the front of the display 22 at S3. Then, the control unit 211 waits for the user to change one or more of the selections and settings in the main setting window 32.

If the user changes one or more of the selections and settings in the main setting window 32 at S4, the control unit 211 changes the appropriate selection/s and/or setting/s in the memory unit 212 at S5. If the user clicks on one of the decision button 328 and cancel button 329 in the main setting window 32 at S6, the control unit 211 erases the main setting window 32 from the display 22 at S7. Then, the processing returns to S1, where the print window 31 appears at the front of the display 22.

If the user clicks on the print start button 315 in the print window 31 at S8 while this window is displayed on the display 22, the control unit 211 activates the print control program 213C in the program storage unit 213. By clicking on the print start button 315, the user enters a print start instruction into the information processor 2.

With reference to FIG. 5, when the print control program 213C is activated, the control unit 211 determines at S11 whether at least one of the stapling, punching and Z-folding functions is selected for the image data file.

As stated already, the stapling, punching and Z-folding functions are post-treatment functions that involve treating prints mechanically, and the face-up delivery, face-down delivery and sorting functions are post-treatment functions that do not involve treating prints mechanically.

Figure 6B:
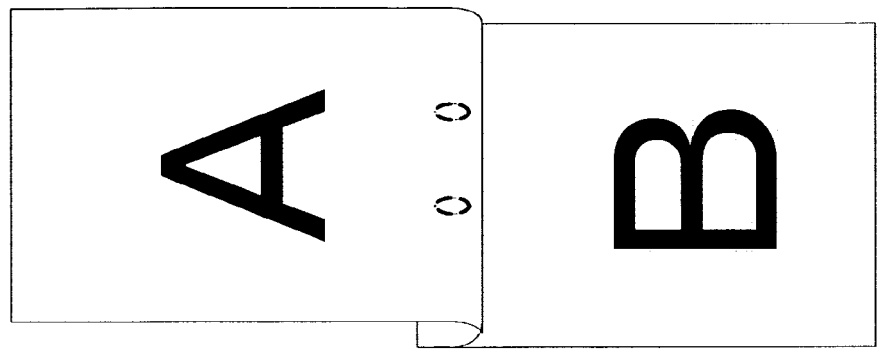
FIGS. 6A and 6B are illustrations of prints punched for side binding and top binding respectively by the printer of the printing system.
Figure 6A:
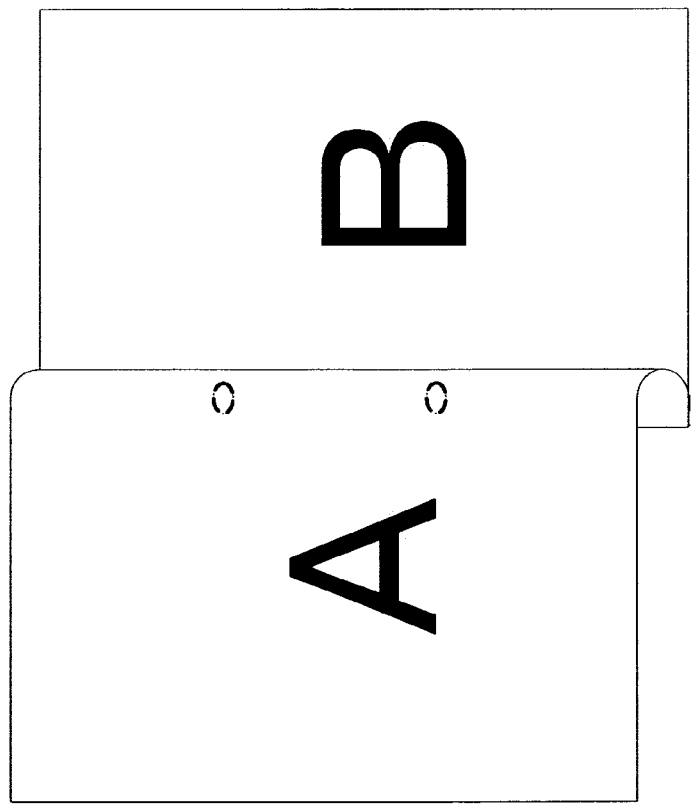

The punching functions are a side punching function as shown by FIG. 6A and a top punching function as shown by FIG. 6B.

Figure 7B:
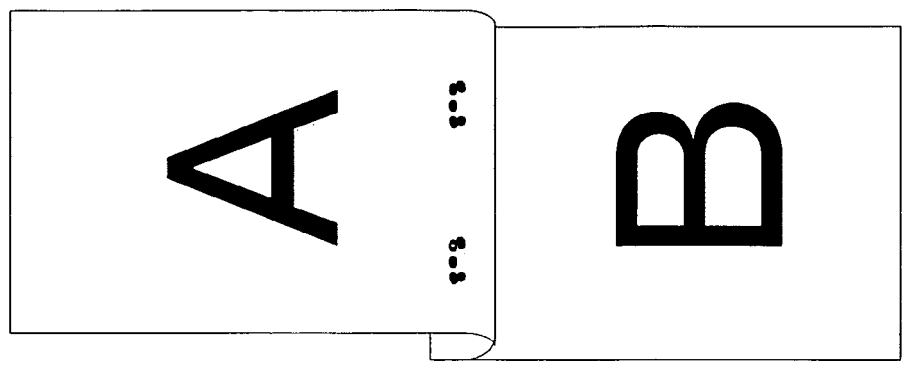
FIGS. 7A and 7B are illustrations of prints stapled for side binding and top binding respectively by the printer.
Figure 7A:
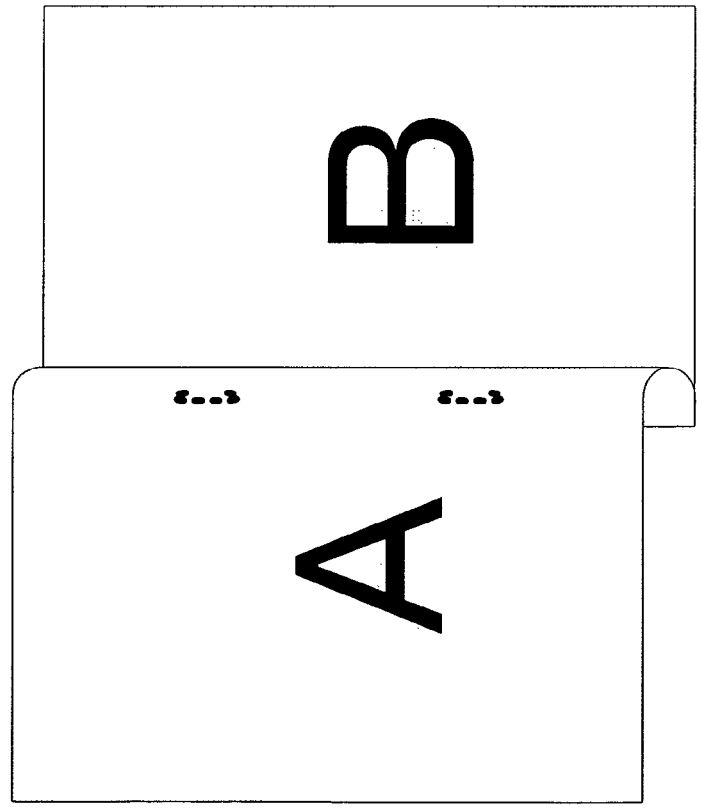
Figure 8B:
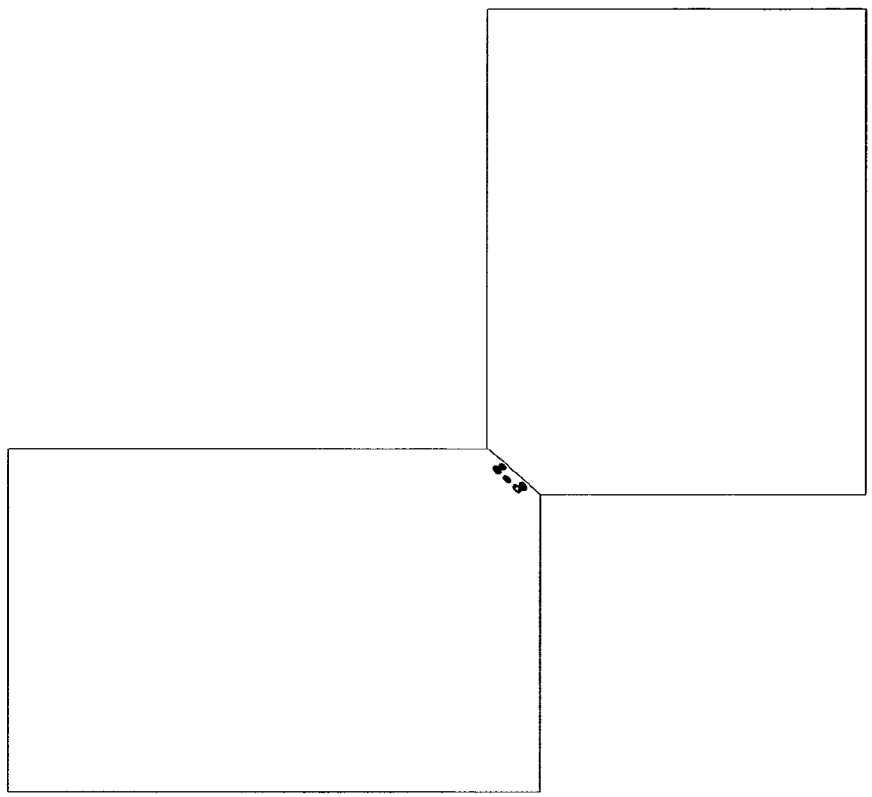
FIGS. 8A and 8B are illustrations of prints stapled for corner binding by the printer.
Figure 8A:
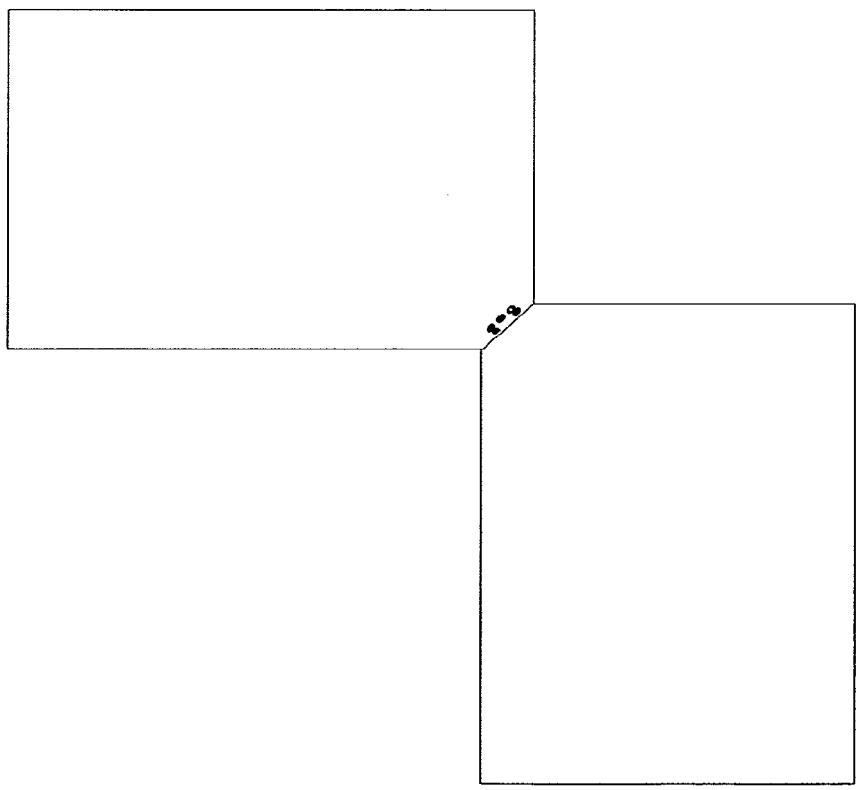

The stapling functions are a side stapling function as shown by FIG. 7A, a top stapling function as shown by FIG. 7B, corner stapling functions as shown by FIG. 8A or 8B, and a saddle stitch stapling function as shown by FIG. 9.

Figure 10B:
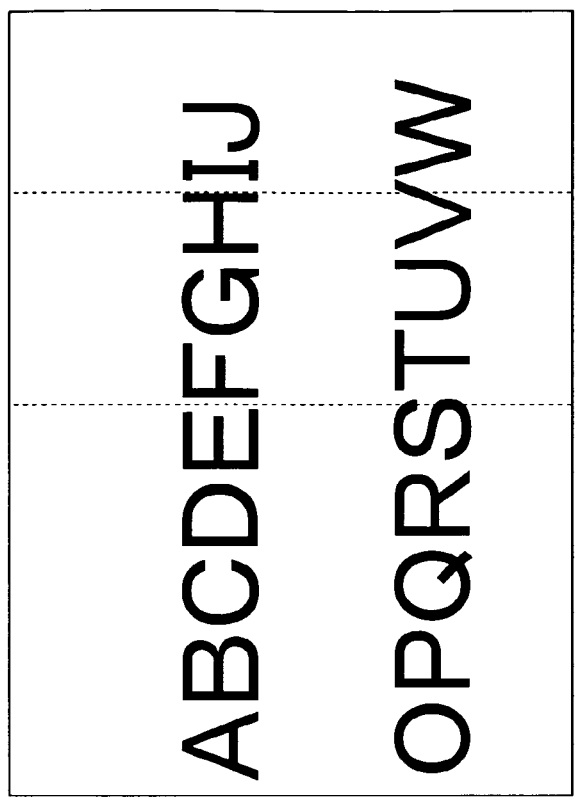
FIG. 10B is an illustration of a print Z-folded by the printer and spread out.
Figure 10A:
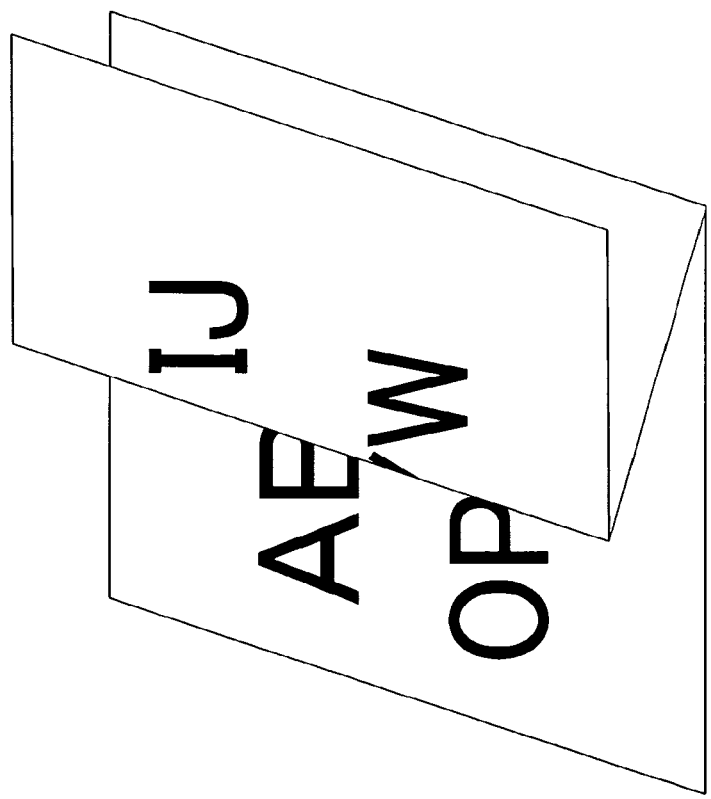
FIG. 10A is an illustration of a print Z-folded by the printer.

The Z-folding function is, as shown by FIGS. 10A and 10B, to fold a print into halves along the center line between its ends, with its printed side closed, and further fold one of the halves (for example, the right half) into halves along the center line between the adjacent end and center line of the print, with the blank side closed.

While the main setting window 32 (FIG. 3) is displayed, the user can select one or more of the post-treatment functions by selecting and/or setting one or more of the items in the area 325 of this window. The Z-folding, face-up delivery, face-down delivery and sorting functions are not shown in the main setting window 32.

Only if none of the stapling, punching and Z-folding functions is selected for the image data file, the control unit 211 creates at S12 a resource saving function select window 33 as shown by FIG. 11. Then, at S13, the control unit 211 displays the created window 33 at the front of the display 22 so that one or two of the double-side and aggregate printing functions can be selected.

If one or two of the face-up delivery, face-down delivery and sorting functions, which do not involve treating prints mechanically, are selected for the image data file, and if none of the stapling, punching and Z-folding functions is selected for the file, the processing proceeds to S12 and S13.

With reference to FIG. 11, the resource saving function select window 33 has a printing condition display area 331, a resource saving result display area 332, an area 333 for the reduction in the number of printed sheets, and a print start decision button 335.

The printing condition display area 331 shows how the printer 1 does printing if it performs its function/s selected for the image data file by the user before the resource saving function select window 33 is displayed.

The area 333 for the reduction in the number of printed sheets consists of an aggregate printing function selection area 333A and a double-side printing function selection area 333B.

The aggregate printing functions are to reduce print data for two or four pages and print the reduced data on one side of a sheet. The aggregate printing functions are a 2-up aggregate printing function and a 4-up aggregate printing function. The aggregate printing function selection area 333A has resource saving buttons 41 and 42 for the 2-up and 4-up aggregate printing functions respectively.

The double-side printing functions are to print print data for two or more pages on both sides of a new print sheet. The double-side printing functions are a side binding double-side printing function and a top binding double-side printing function. The double-side printing function selection area 333B has resource saving buttons 43 and 44 for the side and top binding double-side printing functions respectively.

The resource saving buttons 41-44 are selection members, each of which has a preview image representing print data as printed if the associated function is selected for the data.

The user clicks on the print start decision button 335 so as to decisively instruct the information processor 2 to start the operation of the printer 1. If the print start decision button 335 is clicked on, the control unit 211 converts the image data file into a print data file based on the selected function/s and outputs the print data file to the printer 1.

The resource saving result display area 332 shows resource saving results achieved in the printing done by the printer 1. The resource saving result display area 332 includes an area 332A showing ratios of reduction in the number of sheets. The area 332A shows results of the reduction in the number of print sheets used by the printer 1. Specifically, the area 332A shows monthly ratios of reduction in the number of sheets for three months. Each of these ratios is the value found by dividing the number of printed sheets by the number of pages of image data, subtracting the quotient from 1, and showing the remainder in a percentage.

With reference to FIG. 5, if any one of the resource saving buttons 41-44 is clicked on at S14, the control unit 211 so changes settings for the image data file at S15 that the associated resource saving function can be used.

If the print start decision button 335 is clicked on at S16, the control unit 211 updates the resource saving results stored in the memory unit 212 at S17, converts the image data file into a print data file at S18, and outputs the print data file to the printer 1 at S19. When the printer 1 receives the print data file, it starts to print the file, with the selected function/s activated. After S21, the control unit 211 erases the resource saving function select window 33 at S20, also erases the print window 31 at S21 and terminates the processing. Thus, by clicking on the print start decision button 335, the user enters a print start instruction into the information processor 2.

When the control unit 211 creates a resource saving function select window 33 at S12 and generates a print data file at S18, this unit refers to the contents in the memory unit 212.

Figure 12:
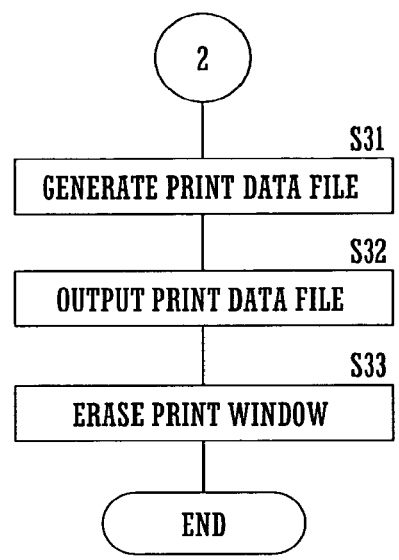
FIG. 12 is a flowchart of an example of the other part of the procedure that the control unit executes according to the print control program.

With reference to FIGS. 5 and 12, if the control unit 211 determines at S11 that at least one of the stapling, punching and Z-folding functions is selected for the image data file, this unit converts the file into a print data file at S31 and outputs the print data file to the printer 1 at S32, without creating and displaying a resource saving function select window 33. Subsequently, the control unit 211 may erase the print window 31 at S33 and terminate the processing.

Thus, if at least one of the stapling, punching and Z-folding functions is selected for the image data file, no resource saving function select window 33 may be displayed, so that none of the double-side and aggregate printing functions may be able to be selected. As a result, the printer 1 may immediately start to print the print data file. This improves the workability of the printing system 100.

According to the print control program 213C, only if none of the stapling, punching and Z-folding functions is selected, one or two of the double-side and aggregate printing functions can be selected. After one or two of the double-side and aggregate printing functions is selected, the print start decision button 335 may be clicked on. In this case, when a print start instruction is detected, printing starts. Accordingly, if one of the stapling, punching and Z-folding functions is selected, none of the double-side and aggregate printing functions can be selected. This prevents accidental selection of any of the double-side and aggregate printing functions.

As stated with reference to FIGS. 6A-10B, the stapling, punching and Z-folding functions are post-treatment functions that involve treating prints mechanically.

The 2-up aggregate printing function is to reduce print data for two pages and print the reduced data on one side of a print sheet. For example, with reference to FIG. 7A, the side stapling function may be selected for the image data file. In this case, if the 2-up aggregate printing function were selected as a resource saving function for the image data file, the relationship between the longitudinal direction of the pages of print data and each of the longitudinal direction and binding direction of a print sheet would differ from that in the case where none of the double-side and aggregate printing functions is selected. Specifically, if the 2-up aggregate printing function were selected, the binding direction might be parallel to the shorter sides of the pages of print data. If none of the double-side and aggregate printing functions is selected, the binding direction may be parallel to the longer sides of the pages.

With reference to FIGS. 10A and 10B, the Z-folding function may be selected as another post-treatment function for the image data file. In this case, if the 2-up aggregate printing function were selected as a resource saving function for the image data file, not only the binding direction of a print sheet would differ, but also the following disadvantage would arise.

For example, the Z-folding function may be selected for a horizontally long page of print data to be printed on an A3 print sheet so as to be large. In this case, if the 2-up aggregate printing function were selected, the page would be reduced to A4 size and printed on a half (for example, the left half) of the A3 print sheet, so that the print might be hard to see.

The Z-folding function may be selected for only one horizontally long page of print data to be printed on an A3 print sheet. In this case, if the 2-up aggregate printing function were selected, the right half of the A3 print sheet would be blank and might be wasteful.

Thus, if at least one of the stapling, punching and Z-folding functions is selected for the image data file, the user is kept from selecting any of the double-side and aggregate printing functions for the file. This prevents the size/s and direction/s of the printed image/s, the binding direction of the print sheet/s, etc. from differing from those intended by the user. Accordingly, the contents of the print/s are prevented from being less appealing. This also prevents the relationship between the direction/s of the printed image/s and the binding direction/s from differing from those intended by the user. Accordingly, the prints are easy to see. As a result, it is possible to restrain reprinting, thereby restraining print sheets from being wasted. Because printing starts without the user selecting any of the double-side and aggregate printing functions, he/she needs to cancel no selected double-side or aggregate printing function. Accordingly, the operability of the printing system 100 is restrained from lowering.

As stated already, if none of the stapling, punching and Z-folding functions is selected for the image data file, but if one or more of the face-up delivery, face-down delivery and sorting functions are selected for the file, the control unit 211 displays the resource saving function select window 33, where the user can select one or two of the double-side and aggregate printing functions. Subsequently, if the print start decision button 335 is clicked on, the control unit 211 executes S17-S21 (FIG. 5)

If the selected post-treatment function/s is/are one or two of the face-up delivery, face-down delivery and sorting functions, which do not involve treating prints mechanically, it is considered that the prints are not conference materials, reports or other documents for which the user has intentionally set the sizes and directions of the printed images, the binding direction of the prints, etc. Accordingly, even if one or two of the double-side and aggregate printing functions are selected in addition to one or two of these post-treatment functions, the prints are kept from being hard to see. This avoids the necessity for reprinting, thereby preventing print sheets from being wasted.

Figure 13:
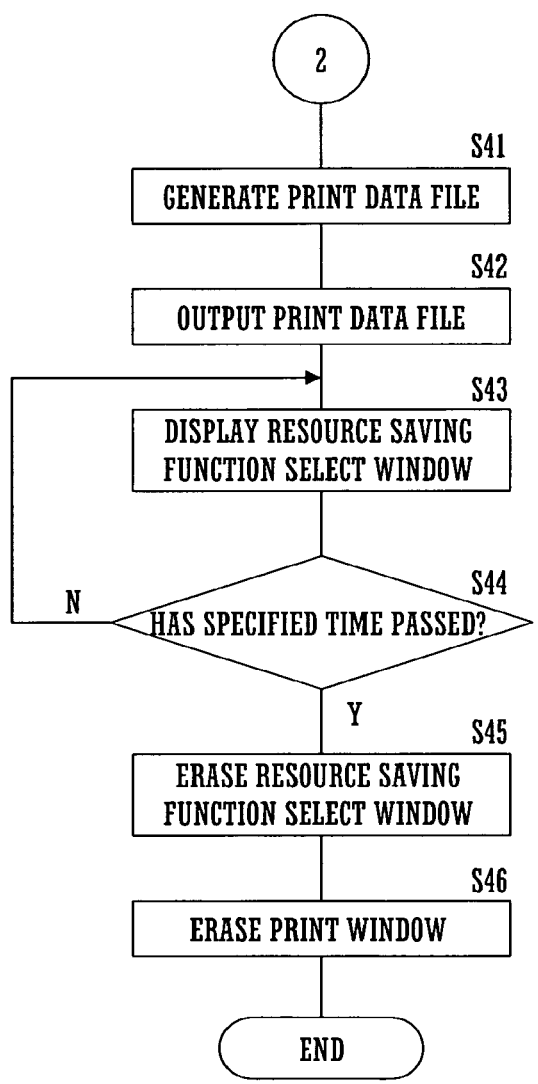
FIG. 13 is a flowchart of another example of the other part of the procedure that the control unit executes according to the print control program.

With reference to FIGS. 5 and 13, if the control unit 211 determines at S11 that at least one of the stapling, punching and Z-folding functions is selected, this unit converts the image data file into a print data file at S41 and outputs the print data file to the printer 1 at S42.

Subsequently, the control unit 211 may display the resource saving function select window 33 on the display 22 for a specified time at S43 and S44 and erase this window at S45 when the time has passed. The specified time is very short and may be 3 seconds. Subsequently, the control unit 211 may erase the print window 31 as well at S46 and terminate the processing. By displaying the resource saving function select window 33, it is possible to make the user conscious of the resource saving functions.

While the resource saving function select window 33 is displayed, a countdown image for the specified time may be displayed on the display 22 to inform the user that this window will disappear in no time. This can relieve the user's feeling of uneasiness.

When the resource saving function select window 33 is displayed at S43 and S44, a message that none of the double-side and aggregate printing functions can be selected may be displayed on the display 22. This clearly indicates that none of the double-side and aggregate printing functions will be performed for the image data file. Specifically, the control unit 211 executes the processing shown by FIG. 14.

Figure 14:
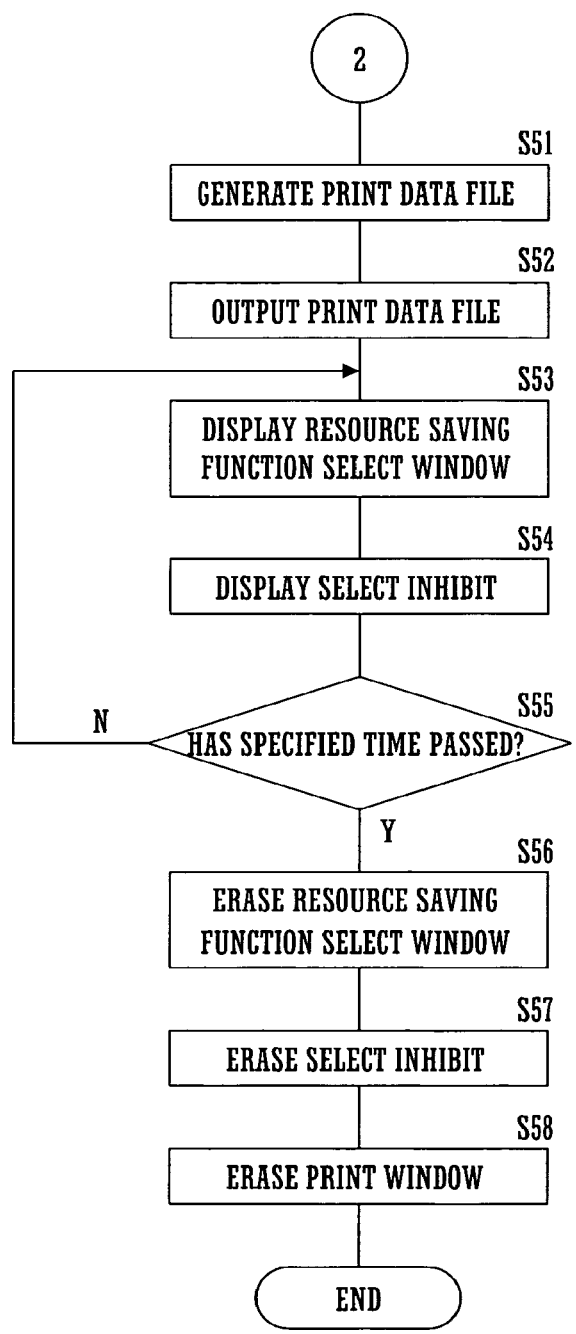
FIG. 14 is a flowchart of still another example of the other part of the procedure that the control unit executes according to the print control program.

With reference to FIGS. 5 and 14, if the control unit 211 determines at S11 that at least one of the stapling, punching and Z-folding functions is selected, this unit converts the image data file into a print data file at S51 and outputs the print data file to the printer 1 at S52.

Figure 15:
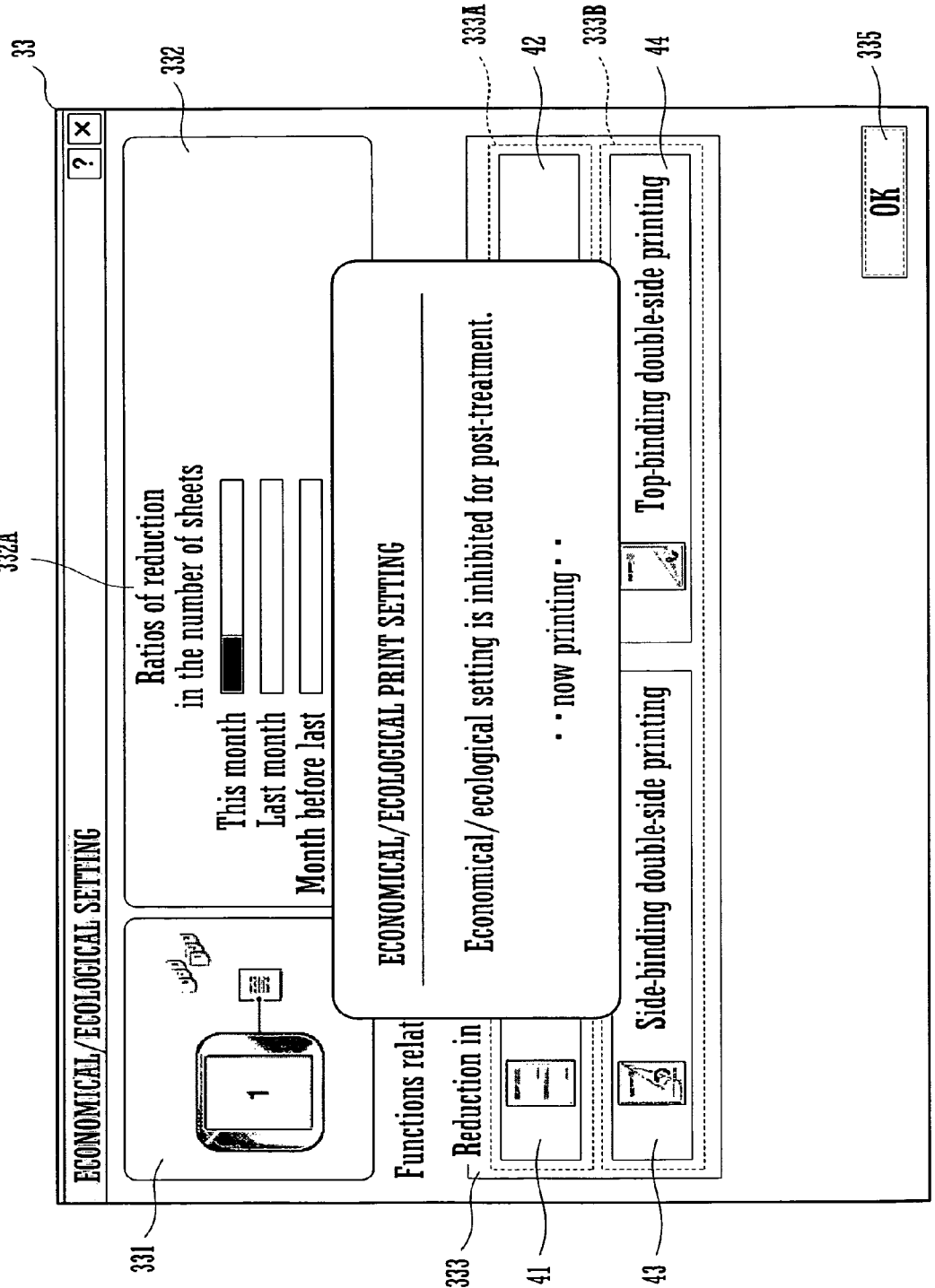
FIG. 15 is an illustration of the resource saving function select window displayed according to the print control program with a message that no resource saving function can be selected.

Subsequently, with additional reference to FIG. 15, the control unit 211 may display on the display 22 the resource saving function select window 33 at S53 and a message 51 at S54. The message 51 states that none of the double-side and aggregate printing functions can be selected, and that the printer 1 is doing printing. After the control unit 211 displays the resource saving function select window 33 for the specified time (S55), this unit may erase this window, the message 51 and the print window 31 at S56-S58 respectively and terminate the processing.

The 4-up aggregate printing function is to reduce print data for four pages and print the reduced data on one side of a print sheet. If the 4-up aggregate printing function is selected for an image data file for four pages, the relationship between the longitudinal direction of the pages and each of the longitudinal direction and binding direction of a print sheet is the same as in a case where none of the double-side and aggregate printing functions is selected for the file. Therefore, the printing system 100 might be so designed that, if one or more of the stapling, punching and Z-folding functions is selected, the 4-up aggregate printing function could be selected, but the 2-up aggregate printing function could not be selected. However, in comparison with the case where none of the double-side and aggregate printing functions is selected, the 4-up aggregate printing function makes small printed images, which are less appealing or otherwise disadvantageous. Therefore, if one or more of the stapling, punching and Z-folding functions are selected, it is preferable that none of the double-side and aggregate printing functions could be selected.

In order to so convert an image data file into a print data file that the printer 1 fulfills part or all of the resource saving functions, the control unit 211 may, when the print start decision button 335 is clicked on, output to the printer 1 the print data file or image data file with a command to perform part or all of the set functions.

The double-side printing functions involve reversing the sides of a print sheet and then feeding it again in the printer 1. Therefore, if one of the double-side printing functions is selected, the control unit 211 outputs to the printer 1 a command to perform this function.

The print control program 213C might be part of the printer driver 212B. If other printer drivers were installed in the program storage unit 213, the print control program 213C could cooperate with any one of the drivers.

It is not essential that the print control program 213C be installed in the information processor 2. If the printer 1 were fitted with a display, the print control program 213C might be installed in and executed by the printer. The print control program 213C might be installed in and executed by a print server on a network.

The print control program 213C might be applied to a printing system including a monochromatic printer.

It is not essential that the print control program 213C be installed in part of the printing system 100, which consists of the printer 1 and information processor 2. The print control program 213C might be installed in a printer that operates in either a copier mode or a fax mode. This printer includes an image reading unit, a fax board and an image forming unit. The image reading unit reads the image on a document and generates an image data file. In the copier mode, the printer converts the generated image data file into a print data file, based on which the image forming unit performs image formation. The fax board has a function for communicating with an external device connected to the printer by a telephone line or another public line. In the fax mode, the printer receives an image data file by means of the fax board and converts it into a print data file, based on which the image forming unit performs image formation.

The image reading unit 14 of the printer 1 might function as a print data file generator for generating a print data file for printing by the printer. The image reading unit 14 might execute the print control program 213C.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A print controller for use with a printing system including a printer having a plurality of resource saving functions capable of contributing to resource savings and a plurality of post-treatment functions for a print, at least one of the functions being able to be selected, the system further including a print data file generator for generating a print data file for printing performed by the printer, one of the printer and the generator being adapted to control the printing according to stepwise print control instructions received from the print controller, the stepwise print control instructions comprising:
   a first step of waiting until at least one of the post-treatment functions is selected, or until a print start instruction is entered;
   a second step of determining whether a specific post-treatment function of the post-treatment functions is selected, when the print start instruction is detected; and
   a third step of causing one of the printer and the generator to control the printing in accordance with the print start instruction without displaying a resource saving function select window having images each representing at least one of the resource saving functions if the specific post-treatment function is selected.

2. The print controller according to claim 1,
   wherein the post-treatment functions for a print include:
      first post-treatment functions for a print involving treating the print mechanically; and
      second post-treatment functions for a print involving physical manipulation thereof that does not mechanically alter the print, and
   wherein the specific post-treatment function is one of the first post-treatment functions.

3. The print controller according to claim 2, wherein the first post-treatment functions for a print include at least one of stapling, punching, and folding of the print.

4. The print controller according to claim 2, wherein the second post-treatment functions for a print include at least one of face-up delivery, face-down delivery, and sorting of the print.

5. The print controller according to claim 1, wherein, if the specific post-treatment function is not selected, the third step displays the resource saving function select window.

6. A print control method for controlling a printer having a plurality of resource saving functions capable of contributing to resource savings and a plurality of post-treatment functions for a print, at least one of the functions being able to be selected, the method further being for controlling a print data file generator for generating a print data file for printing performed by the printer, the method comprising:
   a first step of waiting until at least one of the post-treatment functions is selected, or until a print start instruction is entered;
   a second step of determining whether a specific post-treatment function of the post-treatment functions is selected, when the print start instruction is detected; and
   a third step of causing one of the printer and the generator to control the printing in accordance with the print start instruction without displaying a resource saving function select window having images each representing at least one of the resource saving functions if the specific post-treatment function is selected.

7. A printer for forming an image on printing paper by means of printing based on print data, the printer comprising:
  the print controller according to claim 1, wherein
  the printer is configured to implement the stepwise print control instructions.

8. A printer system comprising:
  the print controller and the printer according to claim 1; and
  an information processor connected to the printer.

* * * * *